Figure 1:
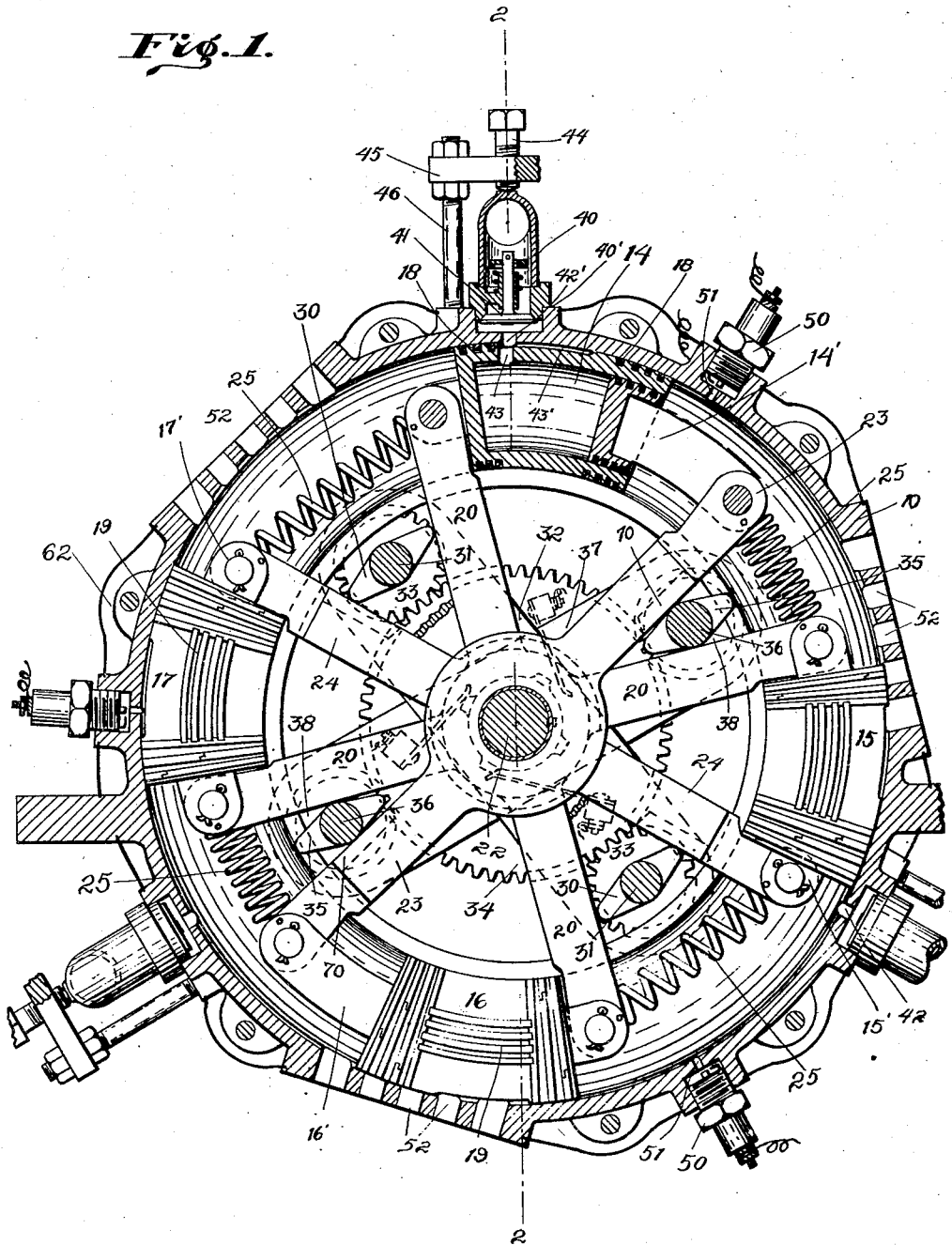

No. 848,845. PATENTED APR. 2, 1907.
A. J. PAIGE.
ENGINE.
APPLICATION FILED JAN. 31, 1907.

2 SHEETS—SHEET 1.

Witnesses.
Karl Clendining.
Thomas H. McMeans.

Inventor.
Arthur J. Paige.
By Bradford Hood
Attorneys.

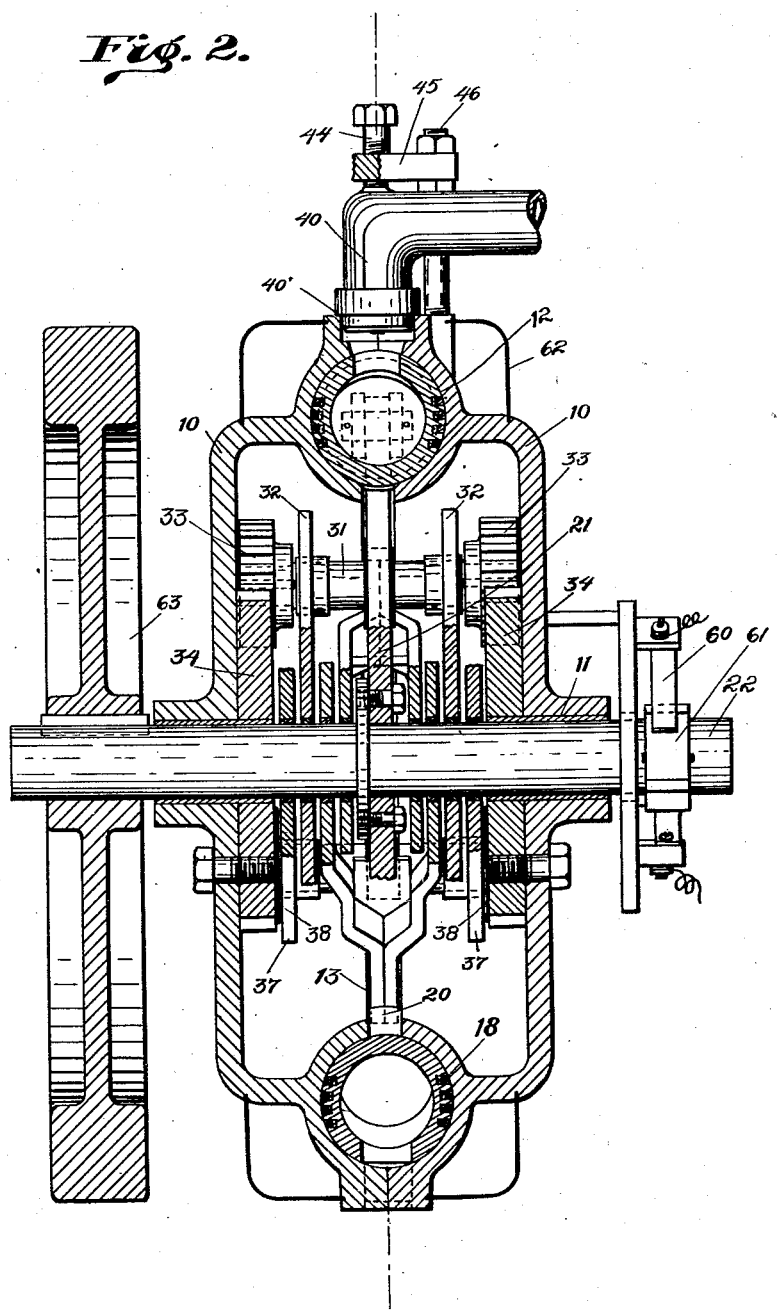

UNITED STATES PATENT OFFICE.

ARTHUR J. PAIGE, OF TERRE HAUTE, INDIANA.

ENGINE.

No. 848,845.  Specification of Letters Patent.  Patented April 2, 1907.

Application filed January 31, 1907. Serial No. 355,098.

*To all whom it may concern:*

Be it known that I, ARTHUR J. PAIGE, a citizen of the United States, residing at Terre Haute, in the county of Vigo and State of Indiana, have invented certain new and useful Improvements in Engines, of which the following is a specification.

The object of my invention is to produce a compact motor, preferably of the internal-combustion type, having a high power per unit of size and weight, and thereby especially suitable for use in automobiles, &c., although not limited to such use.

The accompanying drawings illustrate my invention.

Figure 1 is a transverse section of an apparatus embodying my invention in the form of an internal-combustion engine, and Fig. 2 a section on line 2 2 of Fig. 1.

In the drawings, 10 indicates a main stationary casing which is preferably composed of two supplementary members mating on a medial plane at right angles to the axis of journal-bearings 11, formed therein. The main casing 10 is provided with an annular chamber 12, preferably circular in cross-section and communicating with the interior of casing 10 through a continuous slot 13, formed in the inner wall of said annular chamber.
Mounted in the annular chamber 12 are expansion-chambers 14, 15, 16, and 17, as many of these chambers being provided as may be desired and each of said chambers fitting the annular chamber 13 and being provided at its ends with packing-rings 18 of any well-known form. In order to further pack the expansion-chambers within the annular chamber 13, packing-strips 19, arranged near the axial middles of the expansion-chambers and externally thereto, are provided, said packing-strips extending between the inner packing-rings 18 and interlocking with them, as shown. Each expansion-chamber is attached to an arm 20 of a spider 21, secured to a shaft 22, journaled in bearings 11. The spider 21 and arms 20 therefore rotate with the shaft 22, and the arms 20 project through the groove 13 into the annular chamber 12. Reciprocably mounted in each of the expansion-chambers 14, 15, 16, and 17 is a piston 14', 15', 16', and 17', respectively, pistons 14' and 16' being connected to a pair of oppositely-extending arms 23, which arms are connected together and freely journaled upon shaft 22. Similarly pistons 15' and 17' are connected to a pair of oppositely-extending arms 24, which are connected together and journaled freely upon shaft 22. Each of arms 20 is connected to the adjacent arm 23 or 24 by a spring 25, which tends to draw said arms together, thus causing the piston connected to the corresponding arm 23 or 24 to be moved within its expansion-chamber to its outward position. Arranged between each pair of arms 20 24 is a two-armed cam 30, the arms of which are diametrically opposed, and each of these cams is carried by a planetary shaft 31, which is journaled in a pair of plates 32 32, which are in turn journaled upon shaft 22. Secured to each end of each planetary shaft 31 is a planetary gear 33, which meshes with an adjacent stationary abutment-gear 34, secured to the inside of casing 10. Similarly mounted between each pair of arms 20 23 is a cam 35, like the cams 30, each of said cams 35 being carried by a planetary shaft 36, journaled in a pair of plates 37 37, journaled in turn on the shaft 22. Each planetary shaft 36 is provided at its ends with a planetary gear 38, which gears mesh with the stationary gears 34. In the form shown in the drawings the gears 33 and 38 are one-third the diameter of the stationary gears 34, and therefore arranged at equal distances around the casing 10 are three inlet-valve structures 40, each provided with a suitable inlet-valve 41, leading to an inlet-port 42, which leads into the annular chamber 12. The inlet-valves 41 may be omitted, if desired. Formed through the outer wall of each expansion-chamber is an inlet-port 43, which is extended along the outer face of the expansion-chamber, as at 43', so that while said ports 42 and 43 are themselves comparatively narrow yet the port 43 43' will register with each inlet-port 42 during a considerable period, the inlet-port of each expansion-chamber coming successively into engagement with the inlet-ports of the casing as the expansion-chambers move around through the annular chamber 12.

As a convenience in manufacturing and in order to permit easy access to each inlet-valve I prefer to provide each inlet structure 40 with a shoulder 40', adapted to be held down tight against a corresponding shoulder on casing 10 by means of a set-screw 44, carried by an arm 45, supported upon a pin 46, supported from casing 10, the arrangement being such that by loosening the screw 44 the inlet-valve structure 40 may be sprung out of engagement with the casing 10 and the inlet-valve readily examined.

Arranged adjacent each inlet-port 42 and forward thereof is a suitable spark-plug or other suitable igniting device 50, a port 51 being formed through the wall of casing 10, so that when the inlet-port 43 of the expansion-chamber comes into registry with port 51 the igniter 50 may be available to ignite the combustible charge within said expansion-chamber. Forward of each igniter 50 is a multiple exhaust-port 52, through which the dead gases may be expelled. Any suitable series of contact members 60 and timing-cam 61 may be provided to cause the production of a proper spark at proper times in the spark-plugs 51.

Suitable wearing-blocks 70 may be arranged to take the sliding wear of the cams 30 and 35, if desired, and a suitable cooling-jacket 62 may be provided, if desired. Secured to shaft 22 is a suitable fly-wheel 63.

Supposing the parts to be in the positions illustrated in the drawings and a suitable gaseous fuel to be supplied to the several inlet-valve structures 40, the operation is as follows: A combustible charge having been introduced into the expansion-chamber 14, a rotation of the fly-wheel and shaft 22 will cause a rotation of spider 21 in the same direction, so that its arms 20 will serve to drive the several expansion-chambers in a clockwise direction through the annular chamber 12. This movement of the arms 20 will withdraw them or tend to withdraw them from the cams 30 and 35, so that the springs 25, acting upon the opposed arms 23 or 24, will cause said arms 23 and 24 to act upon the cams 30 and 35, so as to drive shafts 31 and 36 in an orbit around the axis of shaft 22, thus causing the pinions 33 and 38 to roll upon their gears 34, so as to turn the cams 30 and 35 between the arms which straddle the same. Referring particularly to that cam 35 adjacent piston 14', it will be seen that the planetary rotation of this cam in a clockwise direction simultaneous with its planetary revolution in the same direction will tend to retard the rotation of the arm 23, which carries piston 14', thus permitting the combustion-chamber 14 to be driven over its piston 14', so as to compress the charge within the expansion-chamber 14 while the port 43 thereof is approaching the adjacent ignition-port 51, at which time cam 35 will occupy that position between its adjacent arms 20 and 23 which in Fig. 1 is occupied by the cam 30 at the upper left-hand corner of Fig. 1. Supposing the expansion-chamber 17 to have received a charge in the manner just described in connection with chamber 14, it will be seen that if the charge be now ignited within chamber 17 the expansive force will act upon the piston 17', so as to drive its arm 24 toward the arm 20, which carries combustion-chamber 14, (any movement of the arm 20 which carries combustion-chamber 17 being prevented by reason of the fact that it at that time is in engagement with the smallest diameter of the cam 35, which lies between it and the adjacent arm 23,) so that this force acting upon the said cam 30 tends to turn said cam about its axis of rotation in a clockwise direction, thus tending to roll its pinions 33 on the stationary gears 34, and thus, by acting through cam 30 upon arms 20, tend to drive said arms in the same direction as their initial movement.

After the explosion takes place within any expansion-chamber it is translated toward the adjacent exhaust-port 52, and this translation causes the continued rotation of the corresponding cam 35 to such an extent as to again retard the rotative movement of the arms 23, thus permitting the expansion-chamber 14 to be again driven over its piston 14', so as to expel the dead gases from chamber 14 through port 43 into the exhaust-port 52. Further rotative movement of the shaft 22 brings the extension 43' of port 43 into register with the next inlet-port 42, and continued rotation of the cam 35 causes a movement of arm 23 in excess of the rotative movement of the spider 21, (due to the action of the corresponding spring 25,) thus enlarging the expansion-chamber, so as to draw in a fresh charge of fuel. The operation is repeated in regular succession, each expansion-chamber receiving a fresh charge and permitting an explosion during each third of a revolution about the axis of shaft 20.

I claim as my invention—

1. In an engine, the combination with a main casing, of an expansion-chamber mounted in said main casing and movable therethrough around an axis, a piston arranged in said chamber and also movable around the same axis, a planetary element having its orbit around said axis, an abutment with which the planetary element has a rolling driving engagement, means connecting the expansion-chamber and piston with the planetary element whereby the expansive movement of the combustion-chamber and piston will rotate the planetary element.

2. In an internal-combustion engine, the combination with a main casing, of a combustion-chamber mounted in said main casing and movable therethrough around an axis, a piston arranged in said chamber and also movable around the same axis, a planetary element having its orbit around said axis, an abutment with which the planetary element has a rolling driving engagement, and means connecting the combustion-chamber and piston with the planetary element whereby the expansive movement of the combustion-chamber and piston will rotate the planetary element, means for introducing a combustible charge into the combustion-chamber, and means for firing the same.

3. In an engine, the combination of an expansion-chamber and piston therefor, means supporting said chamber and piston for orbituary movement, a planetary element having a rolling driving engagement with an abutment, the said abutment, and intermediate connections between said planetary element and the expansion-chamber and piston whereby relative expansive movement thereof will cause rotation of the planetary element.

4. In an internal-combustion engine, the combination, of a combustion-chamber and piston therefor, means supporting said chamber and piston for orbituary movement, a planetary element having a rolling driving engagement with an abutment, the said abutment, intermediate connections between said planetary element and the expansion-chamber and piston whereby relative expansive movement thereof will cause rotation of the planetary element, means for introducing a combustible charge into the combustion-chamber, and means for firing the same.

5. In an engine, the combination with a main casing having an orbituary chamber, of a pair of elements arranged therein to form between the same an expansion-chamber, means for supporting said pair of elements for orbituary travel through said orbituary chamber, said means permitting relative movement of said pair of elements, a planetary member having a rolling driving connection with an abutment, the said abutment, and connections between the said pair of elements and the planetary element for rotating the planetary element by relative separation of the said pair of elements.

6. In an internal-combustion engine, the combination with a main casing having an orbituary chamber, a fuel-induction port, an eduction-port, and an intermediate firing means, of a pair of elements arranged in the orbituary chamber to form between the same a combustion-chamber, means for supporting said pair of elements for orbituary travel through said orbituary chamber, said means permitting relative movement of said pair of elements, a planetary member having a rolling driving connection with an abutment, the said abutment, and connections between the said pair of elements and the planetary element for rotating the planetary element by relative separation of the said pair of elements.

7. In an engine, the combination with a shaft, of a pair of arms centered upon said shaft, an expansion-chamber carried by one of said arms, a piston fitted in said expansion-chamber and carried by the other of said arms, an abutment-gear, a planetary gear meshing with said abutment-gear, means for supporting said planetary gear for planetary movement about the abutment-gear, and intermediate connections between said planetary gear and the piston and combustion-chamber whereby relative expansive movement of the piston and combustion-chamber will rotate the planetary gear.

8. In an internal-combustion engine, the combination with a shaft, of a pair of arms centered upon said shaft, a combustion-chamber carried by one of said arms, a piston fitted in said combustion-chamber and carried by the other of said arms, an abutment-gear, a planetary gear meshing with said abutment-gear, means for supporting said planetary gear for planetary movement about the abutment-gear, intermediate connections between said planetary gear and the piston and combustion-chamber whereby relative expansive movement of the piston and combustion-chamber will rotate the planetary gear, a fuel-induction passage, an eduction-passage, and an intermediate firing means, said induction-passage, firing means, and eduction-passage being arranged to intermittently and successively register with the combustion-chamber during its orbituary travel.

9. In an engine, the combination with a shaft, of a pair of arms centered upon said shaft, an expansion-chamber carried by one of said arms, a piston fitted in said expansion-chamber and carried by the other of said arms, an abutment-gear, a planetary gear meshing with said abutment-gear, means for supporting said planetary gear for planetary movement about the abutment-gear, a cam carried by the planetary gear and having a sliding engagement with the supporting-arms whereby relative expansive movement of the piston and combustion-chamber will rotate the planetary gear.

10. In an internal-combustion engine, the combination with a shaft, of a pair of arms centered upon said shaft, a combustion-chamber carried by one of said arms, a piston fitted in said combustion-chamber and carried by the other of said arms, an abutment-gear, a planetary gear meshing with said abutment-gear, means for supporting said planetary gear for planetary movement about the abutment-gear, a cam carried by the planetary gear and having a sliding engagement with the supporting-arms whereby relative expansive movement of the piston and combustion-chamber will rotate the planetary gear, a fuel-induction passage, an eduction-passage, and an intermediate firing means, said induction-passage, firing means, and eduction-passage being arranged to intermittently and successively register with the combustion-chamber during its orbituary travel.

11. In an engine, the combination with a main casing having an annular chamber, of an expansion-chamber fitting said annular chamber and having an orbituary movement therethrough, a piston mounted in said expansion-chamber and movable in general therewith, a planetary element having a driving engagement with an abutment, the said abutment, means carried by said casing for introducing into said expansion-chamber an expansive fluid at a point in its orbituary travel, and connections between said planetary element and the piston and expansion-chamber whereby relative expansive movement of the expansion-chamber and piston will rotate the planetary element.

12. In an internal-combustion engine, the combination with a main casing having an annular chamber, an induction-port leading into said chamber, an eduction-port leading from said chamber and an intermediate firing means communicating with said chamber, of a combustion-chamber fitting said annular chamber and having an orbituary movement therethrough, the combustion-chamber having a port adapted to successively register with the induction-port, firing means and the eduction-port, a piston mounted in said combustion-chamber and movable in general therewith, a planetary element having a driving engagement with an abutment, the said abutment, and connections between said planetary element and the piston and combustion-chamber whereby relative expansive movement of the combustion-chamber and piston will rotate the planetary element.

13. In an engine, the combination with a casing having an annular chamber, of an expansion-chamber mounted therein and adapted to travel therethrough, a piston mounted in said expansion-chamber and adapted to travel in general therewith but having a relative movement therein, an abutment-gear, a planetary gear meshing therewith, and intermediate connections between said planetary gear and the expansion-chamber and piston.

14. In an internal-combustion engine, the combination with a casing having an annular chamber, a fuel-inlet port, an eduction-port, and an intermediate firing means, all communicating with the said annular chamber, of a combustion-chamber mounted in said annular chamber and adapted to travel therethrough, a piston mounted in said combustion-chamber and adapted to travel in general therewith but having a relative movement therein, an abutment-gear, a planetary gear meshing therewith, and intermediate connections between said planetary gear and the combustion-chamber and piston, the said combustion-chamber having a port adapted to successively register with the induction-passage, the firing means, and the eduction-passage of the casing.

15. In an engine, the combination with a casing having an annular chamber, of an expansion-chamber mounted therein and adapted to travel therethrough, a piston mounted in said expansion-chamber and adapted to travel in general therewith but having a relative movement therein, an abutment-gear, a planetary gear meshing therewith, a cam carried by the planetary gear, and means connected with said expansion-chamber and piston for engaging the said cam to rotate the same by expansive movement of the said chamber and piston.

16. In an internal-combustion engine, the combination with a casing having an annular chamber, a fuel-inlet port, an eduction-port, and an intermediate firing means, all communicating with the said annular chamber, of a combustion-chamber mounted in said annular chamber and adapted to travel therethrough, a piston mounted in said combustion-chamber and adapted to travel in general therewith but having a relative movement therein, an abutment-gear, a planetary gear meshing therewith, a cam carried by the planetary gear, means connected with said expansion-chamber and piston for engaging the said cam to rotate the same by expansive movement of the said chamber and piston, the said combustion-chamber having a port adapted to successively register with the induction-passage, the firing means, and the eduction-passage of the casing.

17. In an engine, the combination with a main casing having an annular chamber, of a central shaft, an expansion-chamber mounted in said annular chamber and adapted to travel therethrough, a piston mounted in said expansion-chamber and adapted to travel in general therewith but having a relative movement therein, a pair of arms centered upon said shaft and one attached thereto, one of said arms connected to the piston and the other of said arms connected to the expansion-chamber, a stationary gear, a planetary gear meshing with said stationary gear, and intermediate connections between said planetary gear and said arms whereby relative expansive movement of the expansion-chamber and piston will rotate the planetary gear.

18. In an internal-combustion engine, the combination with a main casing having an annular chamber, an induction-passage, a firing means, and an eduction-passage, all communicating with said annular chamber, of a central shaft, a combustion-chamber mounted in said annular chamber and adapted to travel therethrough, a piston mounted in said combustion-chamber and adapted to travel in general therewith but having a relative movement therein, a pair of arms centered upon said shaft and one attached thereto, one of said arms connected to the piston and the other of said arms connected to the combustion-chamber, a stationary gear, a planetary gear meshing with said stationary gear, and intermediate connections between said planetary gear and said arms whereby relative expansive movement of the combustion-chamber and piston will rotate the planetary gear.

19. In an engine, the combination with a main casing having an annular chamber, of a central shaft, an expansion-chamber mounted in said annular chamber and adapted to travel therethrough, a piston mounted in said expansion-chamber and adapted to travel in general therewith but having a relative movement therein, a pair of arms centered upon said shaft and one attached thereto, one of said arms connected to the piston and the other of said arms connected to the expansion-chamber, a stationary gear, a planetary gear meshing with said stationary gear, a cam carried by the planetary gear and engaging said arms whereby relative expansive movement of the expansion-chamber and piston will rotate the planetary gear.

20. In an internal-combustion engine, the combination with a main casing having an annular chamber, an induction-passage, a firing means, and an eduction-passage, all communicating with said annular chamber, of a central shaft, a combustion-chamber mounted in said annular chamber and adapted to travel therethrough, a piston mounted in said combustion-chamber and adapted to travel in general therewith but having a relative movement therein, a pair of arms centered upon said shaft and one attached thereto, one of said arms connected to the piston and the other of said arms connected to the combustion-chamber, a stationary gear, a planetary gear meshing with said stationary gear, a cam carried by the planetary gear and engaging said arms, whereby relative expansive movement of the combustion-chamber and piston will rotate the planetary gear.

21. In an engine, the combination with a casing having an annular chamber therein, of an expansion-chamber mounted therein and adapted to travel therethrough, packing-rings at the ends of said chamber between said expansion-chamber and the annular chamber, and longitudinal packing-strips at opposite sides of the combustion-chamber and interlocking at their ends with the packing members.

22. In an engine, the combination of an expansion-chamber and piston therefor, one of which is movable relative to the other, means supporting said chamber and piston for orbituary movement, a planetary element for rolling driving engagement with an abutment, the said abutment, and intermediate connections between said planetary element and the aforesaid relatively movable element whereby relative expansive movement thereof will cause rotation of the planetary element.

23. In an engine, the combination, of an expansion-chamber and piston therefor, one of which is movable relative to the other, means supporting said chamber and piston for orbituary movement, a planetary gear for rolling driving engagement with an abutment-gear, the said abutment-gear, and intermediate connections between said planetary gear and the aforesaid relatively movable element whereby relative expansive movement thereof will cause rotation of the planetary element.

In witness whereof I have hereunto set my hand and seal, at Indianapolis, Indiana, this 28th day of January, A. D. 1907.

ARTHUR J. PAIGE. [L. s.]

Witnesses:
ARTHUR M. HOOD,
THOMAS W. MCMEANS.